Oct. 22, 1935.    W. S. HALSTEAD    2,017,859
ELECTRONIC TEMPERATURE INDICATING AND CONTROL SYSTEM
Filed June 14, 1933    4 Sheets-Sheet 1

INVENTOR
WILLIAM S. HALSTEAD

Oct. 22, 1935.  W. S. HALSTEAD  2,017,859
ELECTRONIC TEMPERATURE INDICATING AND CONTROL SYSTEM
Filed June 14, 1933   4 Sheets-Sheet 2

Oct. 22, 1935.  W. S. HALSTEAD  2,017,859
ELECTRONIC TEMPERATURE INDICATING AND CONTROL SYSTEM
Filed June 14, 1933  4 Sheets-Sheet 4

INVENTOR
WILLIAM S. HALSTEAD
BY
ATTORNEYS

Patented Oct. 22, 1935

2,017,859

UNITED STATES PATENT OFFICE 2,017,859

ELECTRONIC TEMPERATURE INDICATING AND CONTROL SYSTEM

William S. Halstead, White Plains, N. Y.

Application June 14, 1933, Serial No. 675,864

11 Claims. (Cl. 236—15)

This application is a continuation in part of my pending application Serial Number 636,887, filed October 8, 1932.

This invention relates, in general, to heat regulating systems and is more particularly concerned with systems for the regulation or control of temperature variations by correlated frequency variations of electrical wave generating and frequency responsive apparatus.

The invention is particularly applicable to laboratory oven heat controlling systems in which extremely precise temperature regulation is required and in which the maximum permissible variation from the normal temperature is in the order of a small fraction of a degree; but it will be readily understood that this particularization constitutes no limitation on the invention which may also be employed in many applications apart from that outlined.

Heretofore, in temperature controlling systems it has been customary to employ thermostats or other thermo-responsive devices embodying moving electrical contacts in connection with electro-magnetic relays to limit temperature variations within an oven or other enclosed space. Since the contacts of such devices are subject to changes in resistance caused by chemical or electrical action, such as corrosion and oxidation, the degree of accuracy of temperature regulation effected by such means, over long periods of time, especially, has been limited.

It is a primary object of this invention to provide a method and apparatus whereby variations in temperature from a source of heat may be translated into variations in frequency of an electric control wave by electronic means without the employment of moving elements of any description and means whereby the electric control wave may be utilized so as to regulate the temperature variations of the heat source.

It is another object of this invention to provide means whereby variations in the frequency of the resultant control wave, produced by small variations in temperature of the heat source, may be amplified by electronic means and may then be employed to actuate frequency-responsive or selective devices whose operation controls the temperature of the heat source.

It is a further object of this invention to provide means whereby temperature variations may be simultaneously regulated and indicated by the operation of a single frequency-responsive device actuated by variations in the frequency of the control wave aforementioned.

It is still another object of this invention to provide means whereby the aforementioned control wave may be employed to regulate the temperature of the heat source without the use of electro-magnetic relays or other devices embodying moving electrical contacts of any description.

Other objects will become apparent as the nature of the invention is better understood, and the same consists in the novel form, combination and arrangement of parts hereinafter more fully described, shown in the accompanying drawings and set forth in the appended claims.

According to the preferred embodiment of the present invention, these objects are accomplished by the generation of an audio frequency control wave whose variations in frequency are correlated with and dependent on variations in the joint temperature of two oscillating frequency-determining elements, such as piezo-electric, magnetostriction or similar vibratile resonators, of opposite temperature-frequency coefficients arranged in the input circuits of two independent wave generators, and the provision of means whereby this audio frequency control wave of varying frequency is employed to actuate frequency responsive or selective devices whose operation controls the temperature variations of the heat source.

Figure 1:
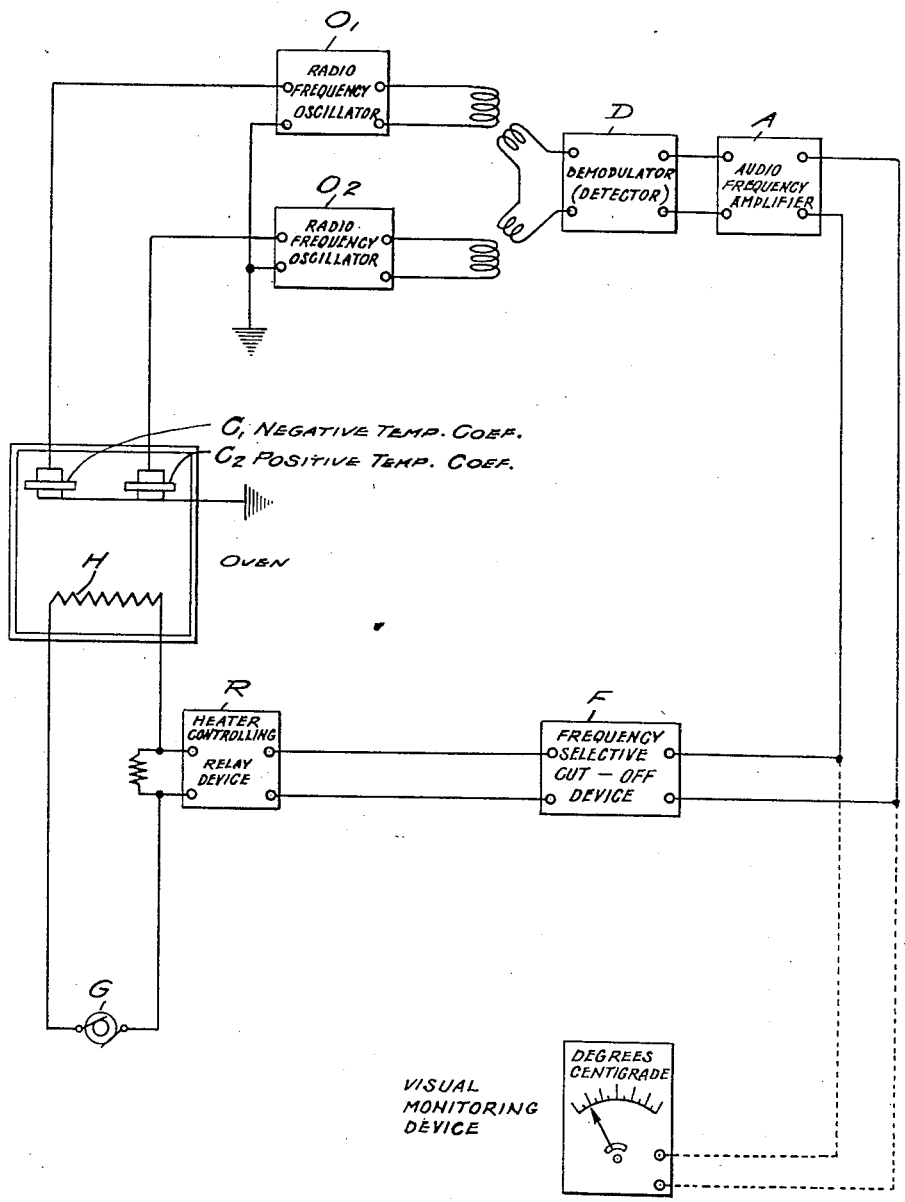
Fig. 1 depicts in schematic outline an apparatus for carrying out the invention.
Figure 2:
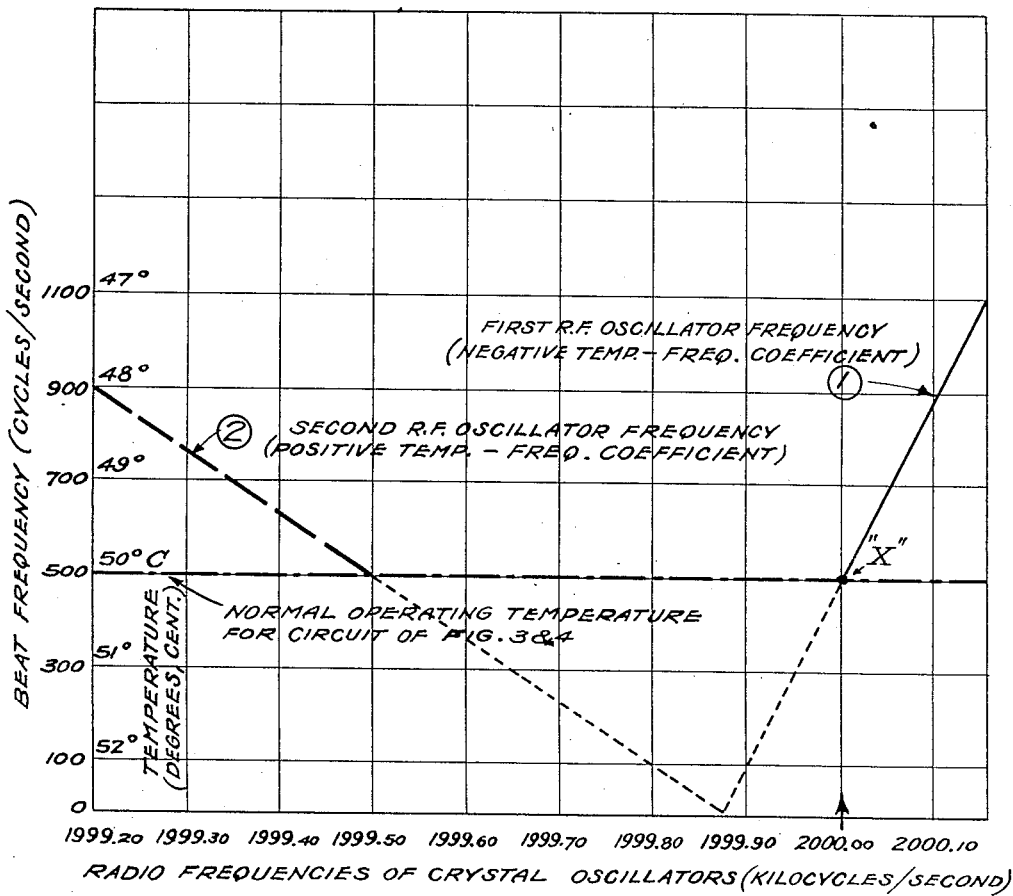
Fig. 2 is a graph showing how the frequencies of two oscillators vary with temperature and also the corresponding frequency variation of the resultant beat frequency.

In a selected application of this invention hereinafter described and illustrated in outline form in Fig. 1, a piezo-electric crystal, $C_1$, of negative temperature-frequency coefficient, such as X-cut quartz, serves as the frequency-determining element of a radio-frequency oscillating circuit, $O_1$. A second piezo-electric crystal, $C_2$, of positive temperature-frequency coefficient, such as Y-cut quartz, is employed as the frequency-determining element of a second radio-frequency oscillating circuit, $O_2$. Radio-frequency wave energy is supplied by the output circuits of both radio-frequency oscillators to the input of a demodulator, or detector, circuit D. Both crystals are jointly heated in the same oven, as illustrated, thereby producing, within a given temperature range, an audio-frequency resultant wave whose frequency variations are the variations in the frequency difference of the two radio-frequency waves, as shown in Figure 2, in which the frequency variations of the two oscillators with variations in temperature and the corresponding variation in frequency of the resultant beat frequency wave are graphically illustrated. The resultant wave, whose frequency, in this instance, decreases toward zero beat as the temperature of the two crystals is increased, is then amplified by an audio-frequency amplifier A, Fig. 1, and is employed to actuate a frequency-selective device F, such as an electric wave filter or a resonant frequency-meter device, whose selective operation at a predetermined frequency controls the operation of a relay device R, connected in series with the oven heating element H, and a source of E. M. F. G.

Figure 3:
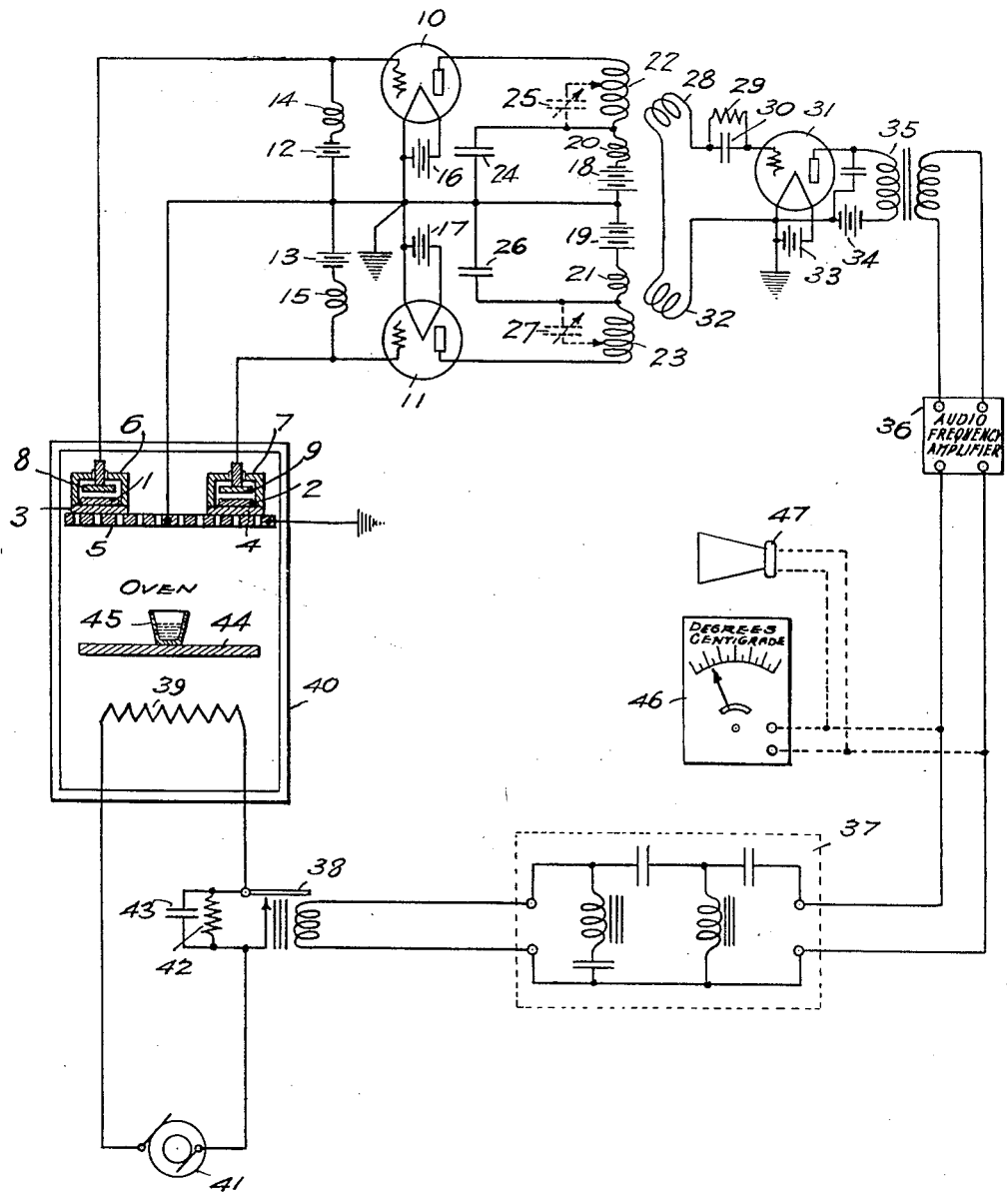
Fig. 3 shows diagrammatically an embodiment of the invention including a demodulator, an amplifier coordinated with frequency selective and relay devices.

The invention will be more fully understood from the following detailed description of a selected embodiment thereof, reference for this purpose being made to Fig. 2 and succeeding circuit drawings in which:

Figure 3 is a schematic diagram of two piezoelectric crystal-controlled oscillators with demodulator, amplifying, frequency-selective and relay devices arranged in accordance with the invention.

Figure 4:
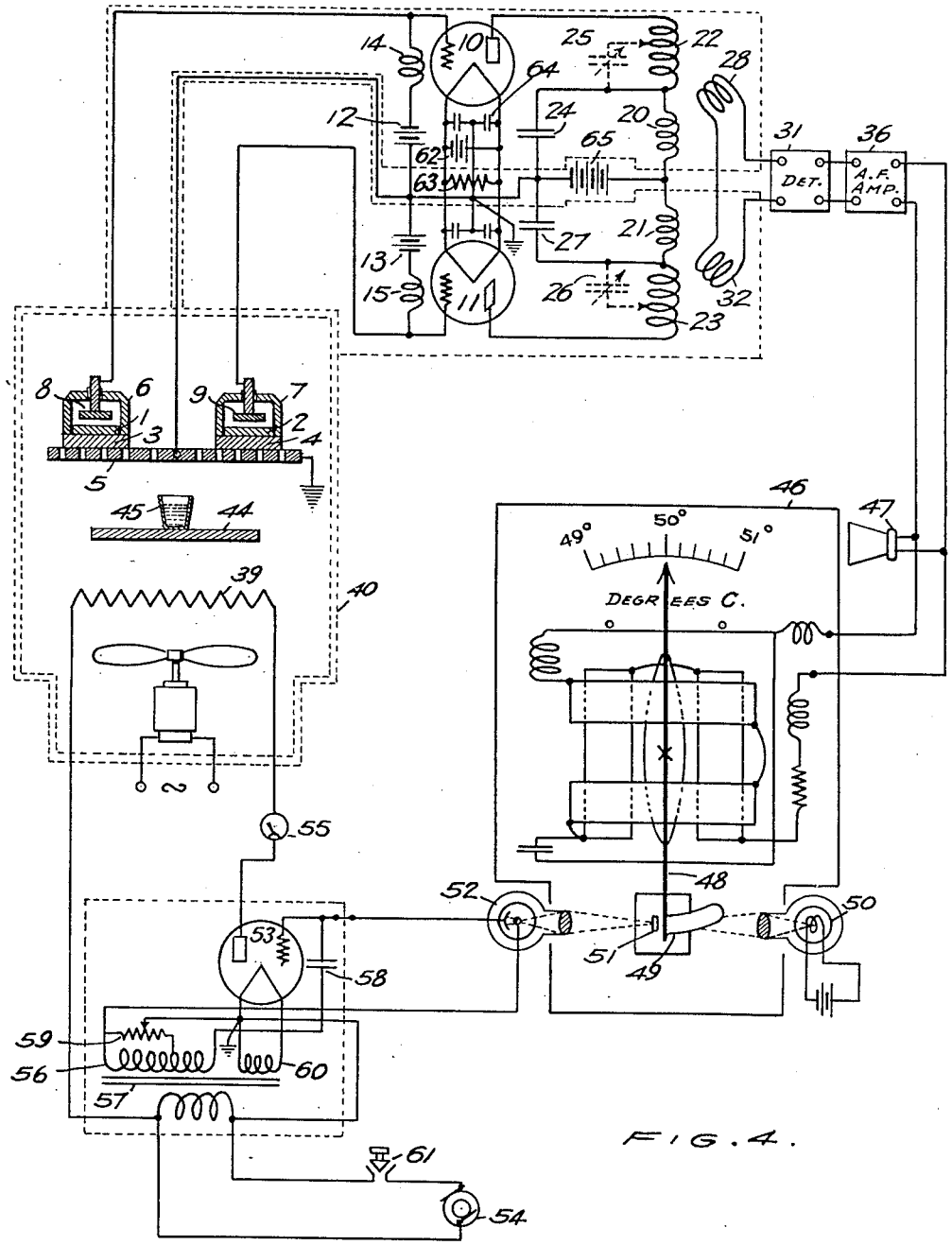
Fig. 4 shows diagrammatically a specific embodiment of the invention with means for temperature control of an oven, and including means for simultaneously providing visual and audible indication of such temperature control.

Figure 4 represents in schematic form an arrangement wherein the wave-generating, demodulating and amplifying system of Fig. 3 controls through the operation of a resonant frequency meter equipped with a photo-electric switching device and an electronic relay the temperature variations of an oven, and simultaneously provides visual and audible indications of the degree of temperature regulation being effected.

Referring to the diagram of Figure 3, two piezoelectric crystals, 1 and 2, are mounted on lower electrodes 3 and 4, respectively, which are in turn mounted on a common perforated metallic plate or grill 5, connected to ground. Protective covers, 6 and 7, enclose crystals 1 and 2, respectively, and serve as supports for upper electrodes 8 and 9, respectively. Crystal 1 is of X-cut quartz, or tourmaline, possessing a negative temperature-frequency coefficient; i. e., its frequency of vibration decreases with an increase in temperature. Crystal 2 is of Y-cut quartz in which the temperature-frequency coefficient is positive, its frequency increasing with increase in temperature. Upper electrodes 8 and 9, associated with crystals 1 and 2, respectively, are connected to the control elements of space discharge oscillators, 10 and 11, respectively. Sources of negative grid potential, 12 and 13, are connected between the grid and cathode circuits of space discharge oscillator tubes, 10 and 11, respectively, through radio-frequency choke coils, 14 and 15, respectively, for supplying the proper bias potentials to the two grids. Sources of E. M. F., 16 and 17, supply cathode heating current to the two oscillator tubes, 10 and 11, respectively. Space current is supplied to tubes 10 and 11 from direct current sources of E. M. F. 18 and 19, respectively, through the radio-frequency choke coils, 20 and 21, respectively, and plate inductances 22 and 23, respectively. Inductance 22 in the plate circuit of oscillator tube 10 and radio-frequency by-pass condenser 24 connected between the plate inductance and the ground, complete the output circuit elements of the oscillating circuit of which crystal 1 is the frequency-determining portion. A variable plate-tuning condenser, 25, may be employed to increase the efficiency of the oscillating circuit. Inductance 23, in the plate circuit of oscillator tube 11, and radio-frequency by-pass condenser 26, connected between the plate inductance and ground, complete the output circuit of the oscillator of which crystal 2 is the frequency-determining element. A variable plate-tuning condenser 27, may likewise be used in this oscillator circuit to increase its efficiency. Coupling means, such as coils 28 and 32, both in series with grid leak 29 and condenser 30, are employed to transfer a small amount of radio-frequency energy from plate inductances 22 and 23 to the input circuit of detector tube 31. A source of E. M. F. 33, supplies cathode heating current to tube 31, and source of E. M. F. 34 provides the space current. A transformer 35, whose primary winding is disposed in the conventional manner in series between source of E. M. F. 34 and the plate of tube 31 couples the output circuit of tube 31 with the input of an audio-frequency amplifier 36. The output of amplifier 36 is connected to the input terminals of a high-pass electric wave filter 37, whose output terminals are connected to an electric relay 38. The contacts of relay 38 are disposed in series with the oven heating resistor 39, of oven 40, and a source of oven heating E. M. F. 41. A current-limiting resistor 42 and spark-reducing condenser 43 are disposed in shunt connection across the contacts of relay 38. A shelf 44, is schematically illustrated as a support for beaker 45 within oven 40, it being assumed that the substance within the beaker is to be held at a constant temperature for a considerable period of time. A visual temperature indicating device, 46, such as a resonant frequency meter calibrated in thermal units, may be connected to the output of amplifier 36 as shown by the dotted lines to provide a visual check on the degree of heat regulation being effected. A loud speaking device 47, may also be connected to the output of amplifier 36 to afford an audible warning signal in the event that the system fails to provide the required temperature regulation. Visual indicating device 46 and loud speaker 47 may be located at a remote monitoring point, if desired, the distance from the temperature controlling system to the remote monitoring location being limited only by the ability of the amplifying circuit to increase the strength of the audio frequency resultant wave to a given value.

When read in connection with the diagram of Figure 3 and the foregoing description of the circuit parts, the operation of the system is outlined as follows:

With the two crystal oscillator circuits in operative condition, the temperature of the oven 40, is initially raised by virtue of the passage of an electric current from source of E. M. F. 41 through current-limiting resistor 42 and oven-heating resistor 39. As the temperature of crystal 1 increases, its frequency of oscillation decreases since its temperature-frequency coefficient is negative. Conversely, as the temperature of crystal 2 rises its frequency of oscillation increases since its temperature-frequency coefficient is positive. With reference to the chart of Figure 2, assuming that crystal 1, of negative temperature coefficient is ground to oscillate at 2000 kilocycles at 50 degrees centigrade, the maximum permissible oven temperature in this example, shown at "X", Fig. 2, it will be seen that its frequency decreases toward 2000 kilocycles from a higher frequency as the temperature is increased toward 50 degrees. Crystal 2, of positive temperature-frequency coefficient, ground to a frequency 500 cycles below 2000 kilocycles, or 1999.50 kilocycles, at the 50 degree maximum permissible oven temperature of this example, on the other hand approaches 2000 kilocycles from a lower frequency as shown by the broken line. It may be seen by further reference to the diagram of Figure 2 that if the temperature of both crystals were permitted to rise several degrees above 50 degrees, the maximum desired oven temperature, the frequencies of both crystals would coincide. This point of zero beat is illustrated in the diagram as the intersection of the two dotted lines, representing the convergence of the two radio frequencies towards a common frequency with unchecked temperature rise—a condition which is not permitted to exist in the operation of the circuits illustrated. The radio-frequency coupling coils 28 and 32 in the common input circuit of detector tube 31 thus supply to detector 31 two waves of different frequencies both of which, as the temperature increases, approach a common zero beat frequency from opposite directions. The audio-frequency resultant wave in the plate circuit of the detector tube, resulting from the interaction of the two radio-frequency waves in the grid circuit, thus decreases in frequency toward zero beat as the radio frequencies at which the two crystals are oscillating draw closer together with increasing temperature, as may be seen by further reference to Figure 2 which also illustrates the approximate change in resultant wave, or beat frequency, with like temperature variations of the crystals. The resultant wave, or beat signal, is intensified by amplifier 36 and is then applied to high-pass wave filter 37, which in this case is designed to pass without marked attenuation all waves whose frequencies are above 500 cycles per second, and to cut off, or strongly attenuate all waves whose frequencies are below this point, thus acting as a frequency-selective device which automatically "cuts-off" when the frequency of the resultant wave falls to 500 cycles or below. As current-limiting resistor 42 initially supplies sufficient current to oven heating resistor 39 to bring the frequency of the resultant wave within the audible range wherein it is amplified by amplifier 36, and since this initial frequency is well above 500 cycles, the resultant wave is passed by filter 37 with practically no attenuation and draws down the armature of relay 38, thereby closing its contacts. The closing of the relay contacts cuts resistor 42 out of the circuit and increases the current to oven heating resistor 39. The corresponding rise in temperature of the crystals produces a further decrease in the frequency of the resultant wave until the 500 cycle point is reached, at which frequency the wave filter 37, so attenuates the resultant wave energy that the armature of relay 38 is released, thereby reducing the current supply to oven heater resistor 39 and reducing the temperature of the crystals. The frequency of the resultant wave increases with decrease in temperature, filter 37 again passes the wave without attenuation, relay 38 closes, the current through oven heating resistor 39 is increased and the temperature of the crystals again rises. This cycle is successively repeated until the alternate increase and decrease in heater current soon maintains the average temperature of the oven within close limits. The failure of any element in the system to function properly will quickly be made apparent by the pronounced movement of the indicating pointer of the frequency meter 46, away from the normal vertical position assumed by the pointer when the frequency of the resultant wave is at 500 cycles. Also, the pronounced change in frequency caused by failure of any part of the system to operate properly will, by means of loud speaker 47, immediately call attention to the trouble. It may be noted by referring to Figure 2, that with the 2000 kilocycle crystal resonators the frequency of the resultant wave changes approximately 200 cycles with one degree centigrade variation in temperature. As wave filters may be made so as to control the operation of a relay with a few cycles change in frequency, temperature regulation of a high degree may be effected. By employing crystals ground to lower or higher frequencies, the range of the system may be increased or decreased, respectively, and the degree of precision of temperature regulation correspondingly decreased or increased.

In the diagram of Figure 4, the system previously described is modified to permit more precise automatic temperature regulation within oven 40 without the use of electric relays or moving electrical contacts by employing the audio-frequency resultant control wave, a resonant frequency-meter device provided with photoelectric control means, and an electronic relay actuated by the photoelectric means. A light-controlling medium, such as opaque vane or shutter 49 is disposed on the pointer arm 48, of a resonant frequency-meter 46. The vane 49, is arranged so as to obstruct the passage of a beam of light from a light source 50, through an aperture 51, to a photoelectric cell 52, when the pointer is to the right of the vertical position, which position corresponds to the normal oven temperature, in this example assumed to be 50 degrees centigrade—representing a corresponding resultant wave frequency of 500 cycles. The cathode of photoelectric cell 52 is connected to the grid of a vacuum tube or a gas-content tube such as a thyratron 53, which is employed in lieu of an electro-magnetic relay to regulate the application of electric power to oven heater resistor 39. The plate of vacuum tube or thyratron 53, is connected through oven heater resistor 39 to a source of alternating E. M. F. 54. A milliammeter 55, may be included in the plate circuit to give visual indication of the plate current of tube 53. The anode of photoelectric cell 52 is connected to one end of secondary winding 56 of transformer 57, the other end of secondary winding 56 being connected through condenser 58 to the grid of tube 53. A potentiometer 59, is disposed across a section of secondary winding 56 to provide for adjustment of the current flow through photoelectric cell 52. The mid-tap of the potentiometer is connected to one side of the filament of tube 53 which is also connected to one side of the primary winding of transformer 57. Current from transformer secondary 60 is employed to heat the cathode of tube 53. A power-supply switch 61, is used to place the system in operative condition. The connections, as described, produce an increase in current in the plate circuit of vacuum tube 53 with an increase in the light received by the photoelectric cell. If a thyratron is used in lieu of vacuum tube 53 the connections are such that no plate current flows until light is received by the photoelectric cell.

The oscillator circuits illustrated in Figure 3 have been modified in Figure 4 by the substitution of a single source of filament current 62, for the separate sources, 16 and 17, of Figure 3. A center-tap resistor 63, is connected across the filaments of tubes 10 and 11 to maintain the opposite ends of the filaments at the same potential with respect to the voltage of the plates. Radio-frequency by-pass condensers 64, are connected in series across the filament terminals of the oscillator tubes, the central series connection being grounded. A single source of plate voltage 65, is employed in lieu of the two sources, 18 and 19, of Figure 3. Coupling coils 28 and 32 are connected in series in the input circuit of detector tube 31, shown in block form.

The principle of operation of the circuit of Figure 4 is similar to that of the circuit previously described and illustrated in Figure 3. As long as the temperature of the oven is below 50 degrees centigrade the frequency of the resultant wave is above 500 cycles and the light-controlling vane 49 carried by the pointer arm 48 of the frequency meter is to the right of the centrally-disposed aperture 51, thereby permitting the passage of light from lamp 50 to photoelectric cell 52, which action applies full plate current to oven heating resistor 39. When the temperature of the oven rises slightly beyond 50 degrees, the desired oven temperature, the corresponding decrease in beat frequency moves the light-controlling vane to the left sufficiently to prevent the passage of light from lamp 50 to photoelectric cell 52. Consequently, the plate current in tube 53 is reduced, the current in oven heater resistor 39 decreases and the temperature of the oven falls. The decrease in oven temperature produces an increase in the beat frequency as previously explained. The opaque vane 49, of the frequency meter moves to the right past the central position uncovering light aperture 51 and the light again reaches photoelectric cell 52; the heater current increases, and the temperature again rises. This cycle is repeated successively until the alternate application and reduction of full heater power soon maintains the average temperature in the oven within close limits. Since the frequency meter, as modified, is calibrated in thermal units, visual indication of the degree of temperature regulation is simultaneously afforded.

It will be recognized that the illustrated systems described are capable of considerable modification and rearrangement without departing from the spirit and the scope of the invention, and it is therefore to be understood that the following claims embrace such modifications and equivalent arrangements as may fairly be construed to fall within the scope of this invention.

I claim:

1. In a temperature control system, means for producing an electric wave whose frequency variations are dependent upon temperature variations; electric heating means for effecting said temperature variations; an electric wave attenuator having input and output circuits for limiting the wave energy of said electric wave within a desired frequency range corresponding to a desired temperature range; and an electronic amplifier whose input circuit is connected to the output of said attenuator and whose output circuit is connected to said electric heating means, said heating means being connected in series in said amplifier output circuit.

2. In a temperature control system, means comprising an electron tube wave generator for producing an electric wave whose frequency variations are dependent upon temperature variations; electric heating means for effecting said temperature variations; tuned frequency-responsive means for electrically selecting wave energy of said electric wave within desired frequency limits; and electron tube means for amplifying the wave energy as selected and thereby effecting control of electric current flow through said electric heating means.

3. In an electronic temperature control system, electron tube means for producing a resultant wave whose frequency changes with temperature; electric heating means for effecting temperature changes; and circuit means operative with said heating means and including resonant frequency-selective components for limiting frequency changes of said resultant wave with respect to desired limits of temperature changes producing such frequency changes.

4. In an electronic temperature control system, electron tube generator means for producing an electric wave whose frequency changes with temperature; electric heating means for effecting temperature changes; electrically resonant means for attenuating said electric wave at frequencies beyond the limits of a desired frequency range corresponding to a desired temperature range; means for amplifying the unattenuated wave energy of said electric wave and applying said unattenuated wave energy to said electric heating means thereby effecting purely electrical control of temperature changes of said heating means.

5. In a temperature indicating and control system, the method which consists in generating an electric wave of one frequency and a second wave of different frequency; causing the frequencies of said waves to change with respect to each other under influence of temperature; combining the said waves to produce a beat frequency wave; electrically limiting the wave energy of said beat frequency wave at specified frequency values of said beat frequency wave corresponding to the desired limits of variation of the temperature effecting said frequency changes; and utilizing said beat frequency wave as electrically limited to visualize the frequency changes in terms of temperature variation and simultaneously to effect control of temperature variations producing said frequency changes.

6. In a temperature control system, the method which consists in generating an electric wave of one frequency and a second electric wave of different frequency; causing the frequencies of said waves to change with respect to each other under influence of temperature variations; combining the said waves to produce a beat frequency wave; electrically attenuating the wave energy of said beat frequency wave in relation to the desired limits of variation of frequency of said beat frequency wave; and utilizing the wave energy from said beat frequency wave as attenuated to electrically regulate the extent of said temperature variations.

7. In a temperature control and indicating system employing oscillating circuits under control of frequency-determining resonators of unlike temperature frequency coefficients; common heating means for varying the temperature of said resonators; means for producing a resultant-wave of variable frequency, the frequency variations of said resultant wave being dependent upon the temperature changes of said resonators; means for amplifying the wave energy of said resultant wave; and resonant frequency-selective means for utilizing the frequency changes of the resultant wave to control the temperature of said resonators, and simultaneously to provide visual indication of the temperature changes of said resonators, including a resonant frequency meter having an indicating needle whose response to frequency variations controls the current flow through said common heating means thereby effecting temperature control of said resonators.

8. In a temperature control system employing oscillating circuits under control of frequency-determining piezo-electric crystals of opposite temperature frequency coefficients; means for jointly heating said crystals; means for producing a resultant wave of variable frequency, the frequency variations of said resultant wave being dependent upon the temperature changes of said crystals; means for amplifying the wave energy of said resultant wave; and resonant frequency responsive means for utilizing the frequency changes of the resultant wave to control the temperature of said crystals and simultaneously to provide precise visual indication of small temperature changes of said crystals, including a resonant frequency meter; an indicating needle on said meter for visually indicating frequency variations in terms of temperature measuring units; a light-controlling element disposed on said needle; a light source; a photoelectric cell disposed so that said light-controlling element changes the amount of light received by said cell as the position of said indicating needle changes with respect to the frequency of said resultant wave; an electron tube for amplifying the changes in current flow through said photoelectric cell; and a space discharge tube whose input circuit is connected to the output of said electron tube and whose output circuit includes said crystal heating means thereby effecting electronic control of current flow through said heating means.

9. In an electronic temperature control system, electron tube means for producing an electric wave whose frequency changes with temperature; electric heating means for effecting temperature changes; electrically resonant means for accepting without attenuation wave energy of said electric wave at frequencies within the limits of a desired frequency range corresponding to the limits of a desired temperature range, said resonant means effecting attenuation of said wave energy at frequencies outside the limits of said desired frequency range; and means comprising an electronic discharge device controlled by said unattenuated wave energy of said electric wave for regulating the temperature changes of said electric heating means.

10. A temperature control system comprising independent wave generators for producing electric waves of different frequencies; frequency determining resonators operative with each generator and having temperature coefficients of frequency opposite in sign; common heating means for varying the temperature of said resonators; electronic means for combining the waves of different frequencies to produce a single low frequency resultant; and means solely responsive to said resultant to effect temperature regulation of said heating means, and simultaneously to provide visible and audible monitoring of the degree of accuracy of such regulation.

11. In an electronic temperature control system, comprising independent wave generators for producing electric waves of different frequencies; frequency determining resonators operative with each generator and having temperature coefficients of frequency opposite in sign; heating means for jointly varying the temperature of said resonators; means for combining the wave energy outputs of said generators to produce a single low frequency resultant whose frequency changes with temperature variations of said resonators; and resonant frequency controlled means for utilizing said resultant to effect temperature regulation of said heating means, and including electrical means simultaneously responsive to the same resultant to provide visible and audible monitoring of the degree of accuracy of such regulation.

WILLIAM S. HALSTEAD.